United States Patent
Marleau-Finley

(10) Patent No.: US 12,180,843 B2
(45) Date of Patent: Dec. 31, 2024

(54) RESILIENTLY DEFORMABLE SEAL RUNNER

(71) Applicant: PRATT & WHITNEY CANADA CORP., Longueuil (CA)

(72) Inventor: Julien Marleau-Finley, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 6 days.

(21) Appl. No.: 18/188,917

(22) Filed: Mar. 23, 2023

(65) Prior Publication Data

US 2024/0318568 A1  Sep. 26, 2024

(51) Int. Cl.
  *F01D 11/00*  (2006.01)
  *F01D 11/02*  (2006.01)

(52) U.S. Cl.
  CPC .......... *F01D 11/003* (2013.01); *F01D 11/025* (2013.01); *F05D 2220/323* (2013.01)

(58) Field of Classification Search
  CPC ........ F01D 11/00; F01D 11/003; F01D 11/02; F01D 11/025; F01D 11/08; F01D 5/00; F01D 5/20; F05D 2220/00; F05D 2220/323–329
  USPC ......................................................... 277/422
  See application file for complete search history.

(56) References Cited

U.S. PATENT DOCUMENTS

| | | | | |
|---|---|---|---|---|
| 8,753,014 | B2* | 6/2014 | Devitt | F16C 33/748 |
| | | | | 384/138 |
| 10,927,960 | B2* | 2/2021 | Bernacchi | F16J 15/26 |
| 11,415,225 | B2* | 8/2022 | Swift | F16J 15/30 |
| 11,549,444 | B2* | 1/2023 | Beinor | F01D 25/183 |
| 2016/0153300 | A1* | 6/2016 | Carrieres | F16J 15/3468 |
| | | | | 277/402 |

\* cited by examiner

*Primary Examiner* — Nathan Cumar
(74) *Attorney, Agent, or Firm* — NORTON ROSE FULBRIGHT CANADA LLP

(57) ABSTRACT

An aircraft engine, has: a shaft rotatable about a central axis; a housing mounted around the shaft; and a seal assembly disposed radially between the shaft and the housing relative to the central axis, the seal assembly having: a sealing ring mounted to the housing, and a seal runner secured to the shaft, the seal runner extending radially relative to the central axis from an inner face facing the shaft to an outer face facing the sealing ring and being radially spaced apart from the sealing ring by a gap, the seal runner resiliently deformable from an at-rest shape where no axial compression force is exerted on the seal runner to a pre-loaded shape where the seal runner is axially clamped on the shaft by an axial compression force, an outer diameter of the outer face greater in the pre-loaded shape than in the at-rest shape.

17 Claims, 5 Drawing Sheets

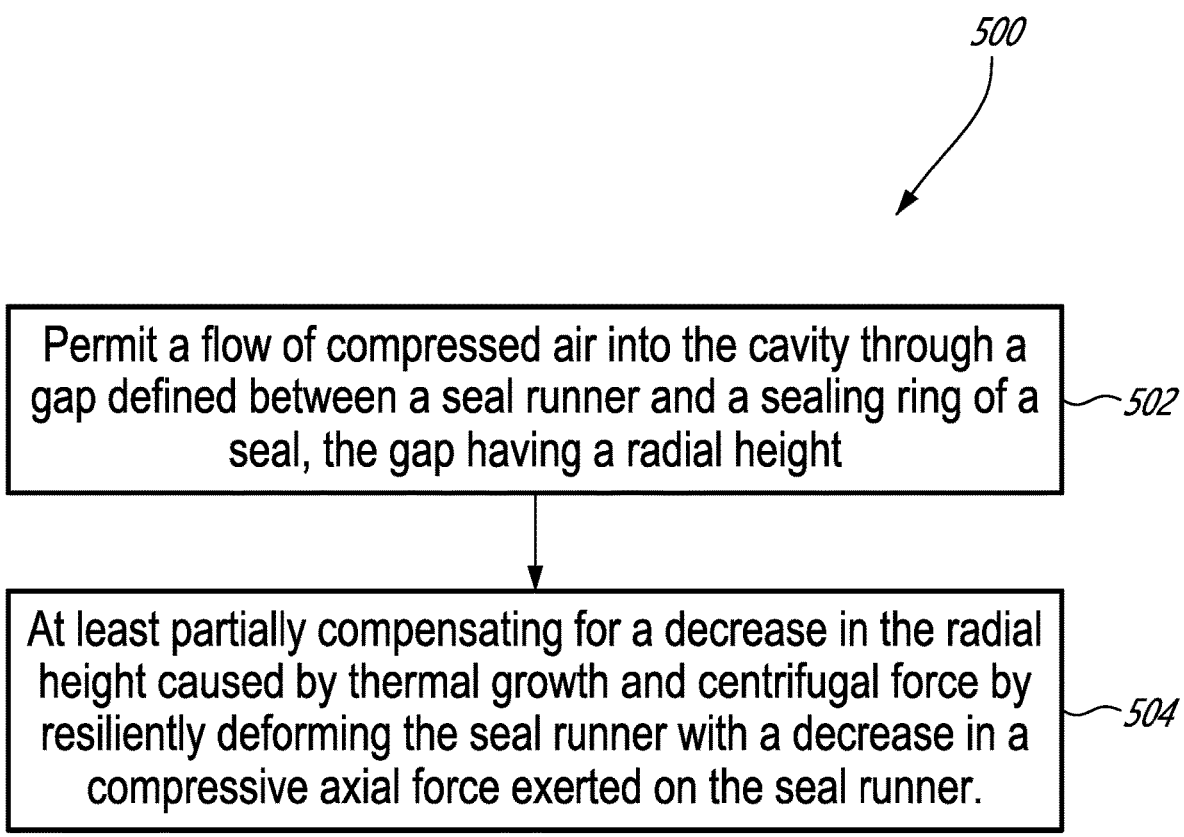

RESILIENTLY DEFORMABLE SEAL RUNNER

TECHNICAL FIELD

The application relates generally to aircraft engines and, more particularly, to systems and methods for sealing a compartment, such as a bearing housing.

BACKGROUND

Gas turbine engines often require seals to isolate cavity, such as a bearing cavity, from an environment outside thereof. The seals are used to keep lubricant within the bearing cavity. A type of seal used for this purpose is referred to as a controlled gap seal in which a small controlled gap is defined between a rotating part, referred to as a seal runner, and a static part, referred to as a sealing ring. The bearing cavity is typically pressurized from the outside such that a flow of compressed air is able to circulate through the controlled gap thereby limiting leakage of the lubricant. However, thermal growth and centrifugal force affect a dimension of this controlled gap, which may results in a decrease of the sealing efficiency in some conditions. Improvements are therefore sought.

SUMMARY

In one aspect, there is provided an aircraft engine, comprising: a shaft rotatable about a central axis; a housing mounted around the shaft, the shaft rotatable relative to the housing; and a seal assembly disposed radially between the shaft and the housing relative to the central axis, the seal assembly having: a sealing ring mounted to the housing, and a seal runner secured to the shaft, the seal runner extending radially relative to the central axis from an inner face facing the shaft to an outer face facing the sealing ring and being radially spaced apart from the sealing ring by a gap, the seal runner resiliently deformable from an at-rest shape where no axial compression force is exerted on the seal runner to a pre-loaded shape where the seal runner is axially clamped on the shaft by an axial compression force, an outer diameter of the outer face greater in the pre-loaded shape than in the at-rest shape.

The aircraft engine described above may include any of the following features, in any combinations.

In some embodiments, the inner face has a curved section having a first curvature in the at-rest shape and a second curvature in the pre-loaded shape, the second curvature greater than the first curvature.

In some embodiments, the seal runner includes a base secured to the shaft and defining the inner face, a sealing flange secured to the base and defining the outer face, and a web connecting the sealing flange to the base, an intersection between the web and the base axially overlapping a curved section of the inner face.

In some embodiments, the base has a U-shape cross-section taken in a plane containing the central axis.

In some embodiments, the intersection between the web and the base is located at an apex of the curved section of the inner face.

In some embodiments, an axial width of the base is greater in the at-rest shape than in the pre-loaded shape.

In some embodiments, the inner face includes a first seat section, a second seat section, and a curved section between the first seat section and the second seat section, the first seat and the second seat sections in abutment against the shaft.

In another aspect, there is provided a seal assembly, comprising: a sealing ring circumferentially extending around a central axis; and a seal runner disposed radially inwardly of the sealing ring relative to the central axis, the seal runner having an inner face facing the central axis, and an outer face facing the sealing ring and spaced apart from the sealing ring by a gap, wherein the seal runner is resiliently deformable from an at-rest shape where no axial compression force is exerted on the seal runner to a pre-loaded shape when an axial compression force above a threshold is exerted on the seal runner, a radial height of the gap decreasing from the at-rest shape to the pre-loaded shape of the seal runner.

The seal assembly described above may include any of the following features, in any combinations.

In some embodiments, the inner face has a curved section having a first curvature in the at-rest shape and a second curvature in the pre-loaded shape, the second curvature greater than the first curvature.

In some embodiments, the seal runner includes a base defining the inner face, a sealing flange secured to the base and defining the outer face, and a web connecting the sealing flange to the base, an intersection between the web and the base axially overlapping a curved section of the inner face.

In some embodiments, the base has a U-shape cross-section taken in a plane containing the central axis.

In some embodiments, the intersection between the web and the base is located at an apex of the curved section of the inner face.

In some embodiments, an axial width of the base is greater in the at-rest shape than in the pre-loaded shape.

In some embodiments, the inner face includes a first seat section, a second seat section, and a curved section between the first seat section and the second seat section, the first seat and the second seat sections abuttable against a shaft.

In yet another aspect, there is provided a method of sealing a cavity disposed radially between a housing and a shaft of an aircraft engine, the method comprising: permitting a flow of compressed air into the cavity through a gap defined between a seal runner and a sealing ring of a seal, the gap having a radial height; and at least partially compensating for a decrease in the radial height caused by thermal growth and centrifugal force by resiliently deforming the seal runner with a decrease in a compressive axial force exerted on the seal runner.

The method described above may include any of the following features, in any combinations.

In some embodiments, the seal runner has an inner face facing the shaft, the resiliently deforming of the seal runner includes decreasing a curvature of the inner face.

In some embodiments, the decreasing of the curvature of the inner face includes moving a curved section of the inner face towards the shaft.

In some embodiments, the seal runner includes a base secured to the shaft and defining an inner face of the seal runner, a sealing flange secured to the base and defining the outer face, and a web connecting the sealing flange to the base, an intersection between the web and the base axially overlapping a curved section of the inner face, the resiliently deforming of the seal runner includes moving the intersection towards the shaft.

In some embodiments, the intersection between the web and the base is located at an apex of the curved section of the inner face.

In some embodiments, the resiliently deforming the seal runner includes increasing an axial width of the seal runner.

BRIEF DESCRIPTION OF THE DRAWINGS

Reference is now made to the accompanying figures in which:

FIG. 5 is a flowchart illustrating steps of sealing a cavity of the bearing assembly of FIG. 2.

DETAILED DESCRIPTION

Figure 1:
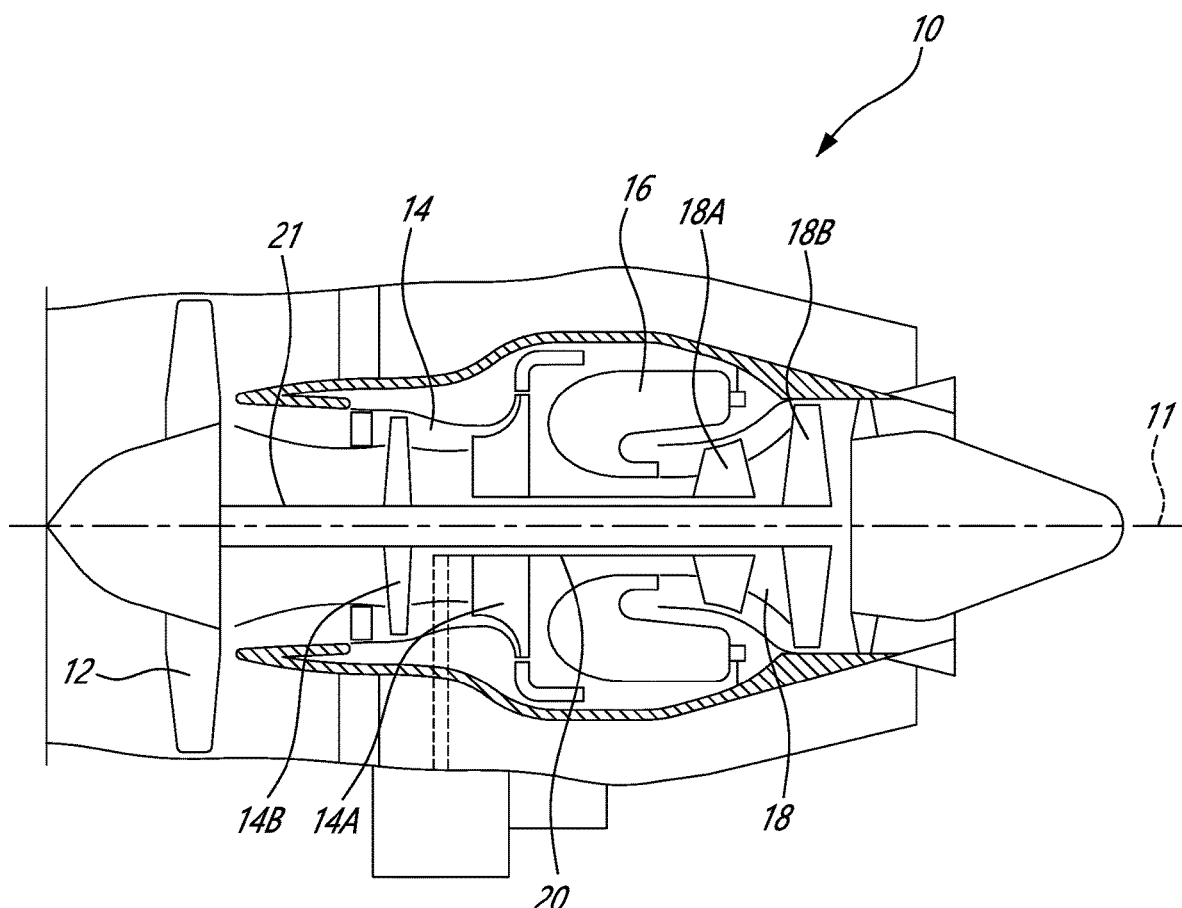
FIG. 1 is a schematic cross-sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section to a low-pressure compressor 14B of the compressor section 14 and drivingly engaged to the fan 12. It will be understood that the contents of the present disclosure may be applicable to any suitable engines, such as turboprops and turboshafts, and reciprocating engines, such as piston and rotary engines without departing from the scope of the present disclosure.

Figure 2:
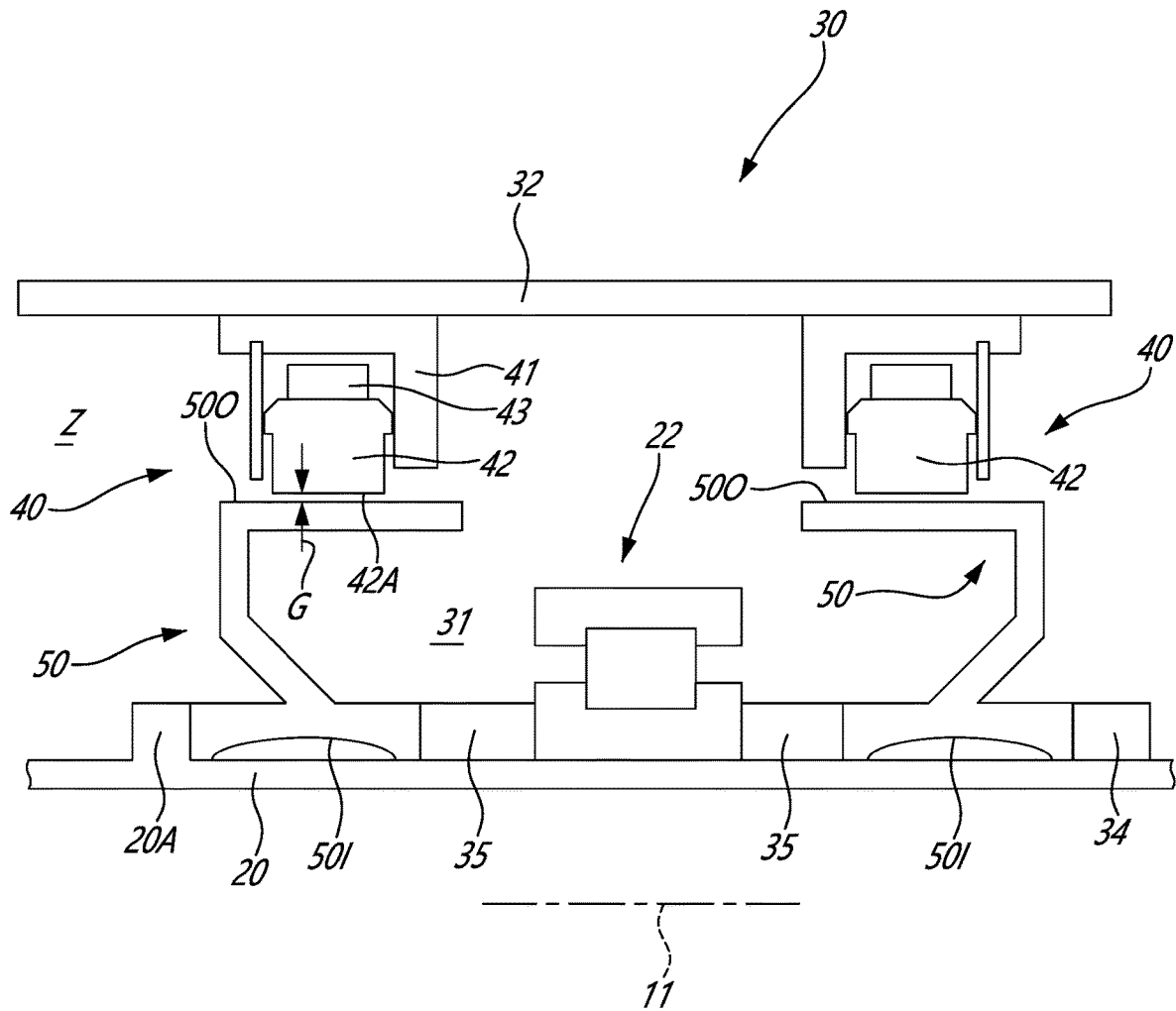
FIG. 2 is a cross-sectional view of a bearing housing assembly of the gas turbine engine of FIG. 1.

Referring now to FIG. 2, the gas turbine engine 10 includes a bearing housing assembly 30 for containing a bearing 22 used for rollingly supporting one of the shafts (e.g., low-pressure shaft 21, high-pressure shaft 20) of the gas turbine engine 10. The gas turbine engine 10 may include many bearing housing assemblies each containing one or more bearing 22. The bearing housing assembly 30 defines a bearing cavity 31 that contains the bearing 22. The bearing cavity 31 is supplied with oil for lubricating the bearing 22. The bearing housing assembly 30 includes a bearing housing 32 secured to a structural component of the gas turbine engine 10, such as a casing thereof, and seal assemblies 40, herein two seal assemblies, disposed on opposite sides of the bearing 22, for restricting the oil from leaking out of the bearing cavity 31.

The seal assemblies 40 are disposed between a static component, such as the bearing housing 32, and a rotating component, such as the high-pressure shaft 20. Since the two seal assemblies 40 are similar, the below description will use the singular form for clarity, but it is understood that the description below may apply to both seal assemblies 40.

In the present embodiment, the seal assembly 40 is a non-contacting seal, also referred to as a controlled gap seal. Herein, the expression "non-contacting seal" refers to a type of seal in which two complementary portions of the seal are designed to be spaced apart by a controlled gap G during typical operating conditions. The small, controlled gap G limits gas flow and thus maintains a positive pressure differential leading into the bearing cavity 31, and due to the positive pressure, the bearing lubricant may be kept within the bearing cavity 31. The gap G may vary in size with, for instance, changes in the operating conditions, vibrations typically occurring during normal operations, thermal expansion, and deformation imparted due to centrifugal force. In some cases, the two complementary portions may contact each other. Such contacts are typically limited during a mission. When they occur, the two components typically do not remain in contact for a long time (e.g., a few seconds).

One of the challenges in a non-contacting seal consists in keeping a dimension of the gap G between the two complementary portions substantially constant so that it is able to maintain a pressure differential between the bearing cavity 31 and a zone Z outside the bearing cavity 31 while limiting contacts between the complementary portions, and in maintaining the dimension of the gap G throughout varying operating conditions. Some occasional contact is accepted. However, prolonged contact may result in excessive heat generation that may impair a proper operation of the gas turbine engine 10.

In the embodiment shown, the seal assembly 40 includes a support 41 that houses a sealing ring 42, also referred to as a carbon ring. The sealing ring 42 annularly and continuously extends all around the central axis 11. Stated otherwise, the sealing ring 42 may be integral, as opposed to being formed of separate segments. The continuous aspect of the sealing ring 42 imparts a certain amount of structure, such as a continuous arch, which may allow to resist forces such as forces stemming from a pressure differential for instance, and to maintain the controlled gap G. The seal assembly 40 includes a counter component, referred to as a seal runner 50, that cooperates with the sealing ring 42. The sealing ring 42 and the seal runner 50 are concentric about the central axis 11. In the depicted embodiment, the sealing ring 42 is located radially outwardly to the seal runner 50. However, in some other embodiments, the sealing ring 42 may be located radially inwardly of the seal runner 50. It is understood that the support 41 may be defined by an engine casing or by the bearing housing 32.

The seal runner 50 and the sealing ring 42 rotate relative to each other about the central axis 11. The seal runner 50 and the sealing ring 42 define respective sealing faces facing one another and spaced apart from one another by the gap G. In the embodiment shown, the gap G is a radial gap that extends axially relative to the central axis 11. The gap G extends along a radial direction relative to the central axis 11 and has a radial height.

The gap G fluidly connects the bearing cavity 31 with the zone Z outside the bearing cavity 31. In the embodiment shown, to limit lubricant contained within the bearing cavity 31 from leaking, pressurized air (e.g. air taken from one or more compressor stage) may be used to increase an air pressure outside the bearing cavity 31 beyond the pressure within the bearing cavity 31, thereby creating a positive pressure differential therebetween. A controlled, relatively small amount of compressed air may continuously leak into the bearing cavity 31 via the gap G, which may prevent oil leakage in the opposite direction. The compressed air may come from the compressor section 14 of the gas turbine engine 10.

In the embodiment shown, the seal assembly 40 includes a shrink band 43 is disposed around the sealing ring 42. The shrink band 43 may be made of a material having a similar coefficient of thermal expansion (CTE) than that of the seal runner 50. In the embodiment shown, the shrink band 43 is made of the same material than that of the seal runner 50. The shrink band 43 is in engagement with an outer face of the sealing ring 42. The shrink band 43 is heat shrunk or shrink fitted around the sealing ring 42 so as to decrease a diameter of the sealing ring 42. The shrink band 43 may frictionally engage the sealing ring 42. In other words, an inner diameter of the shrink band 43 may be less than an outer diameter of the sealing ring 42 before the shrink band 43 is disposed around the sealing ring 42.

In use, a temperature increase may result in expansion of the seal runner 50 and of the shrink band 43 in a similar manner as they have similar CTEs. An increase in temperature of the shrink band 43 may therefore result in an increase in its diameter and may allow the sealing ring 42 to also increase in diameter in the same manner as the shrink band 43. In other words, thermal expansion of the shrink band 43 allows the sealing ring 42 to expand toward an original shape of the sealing ring 42; the original shape corresponding to a shape of the sealing ring 42 before the shrink band 43 was heat shrunk around the sealing ring 42. In some cases, thermal expansion of the shrink band 43 allows a diameter of the sealing ring 42 to extend beyond an original diameter of the sealing ring 36. In a particular embodiment, the seal clearance (e.g., gap G) is controlled thermally. The gap G may gradually close as the speed and temperature increase, thus the term 'controlled gap'. This may be made possible by designing the composite seal ring (e.g., sealing ring 36) to have a similar thermal expansion rate to that of the rotating element with compensation to account for the centrifugal growth.

However, when the gas turbine engine 10 is cold, a dimension of the gap G is expected to be greater than when hot. This may result in leakage and efficiency penalties during the transition period during which the gas turbine engine 10 is warming up to its steady state operating temperature. The gap G closes as the temperature rises because of thermal growth and centrifugal force on the seal runner 50. In some embodiments, the thermal growth accounts for about 80% of the total radial deformation whereas the centrifugal force is responsible for a remainder (e.g., 20%) of the total radial deformation. The seal runner 50 disclosed herein may at least partially alleviate these drawbacks.

In the embodiment shown, the seal runner 50 is axially clamped on the high-pressure shaft 20, herein between a protrusion 20A of the high-pressure shaft 20 and a nut 34 threadingly engaged to the high-pressure shaft 20. Any suitable means of axially clamping the seal runner 50 on the shaft is contemplated. One or more spacer(s) 35 may be disposed between the seal runner 50 and the bearing 22. Herein, a spacer 35 is disposed between a left seal runner and the bearing 22 and another spacer 35 is disposed between the bearing 22 and a right seal runner. Other configurations are contemplated. In some embodiments, these spacers 35 may be omitted. The nut 34 may be torqued sufficiently to exert an axial compressive force on the seal runner 50.

Figure 3:
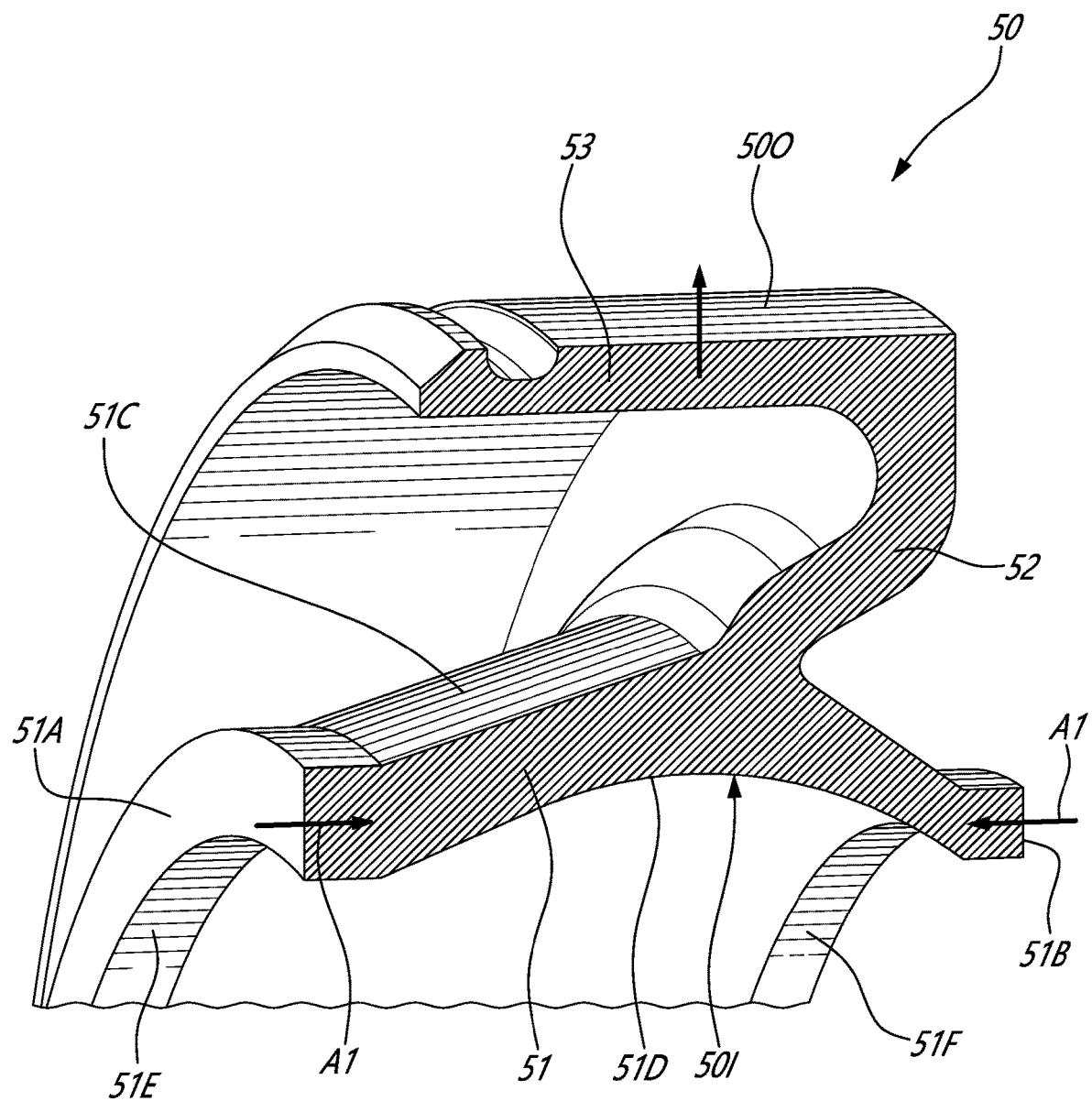
FIG. 3 is a three dimensional cutaway view of a seal runner for the bearing housing assembly of FIG. 2 in accordance with one embodiment.

Referring now to FIGS. 2-3, the seal runner 50 is described in greater detail. The seal runner 50 extends radially relative to the central axis 11 from an inner face 50I to an outer face 50O. The inner face 50I faces the high-pressure shaft 20 and the central axis 11 whereas the outer face 50O faces the sealing ring 42 (FIG. 2). The outer face 50O is radially spaced apart from an inner face 42A of the sealing ring 42 by the gap G. As will be further described below, the seal runner 50 is resiliently deformable from a pre-loaded shape depicted in FIG. 4A to an at-rest shape depicted in FIG. 4B. An outer diameter of the seal runner 50 at the outer face 50O is greater in the pre-loaded shape than in the at-rest shape. In other words, a radial height of the gap G may decrease from the at-rest shape to the pre-loaded shape of the seal runner 50 when other conditions (e.g., temperature, rotational speed, etc) are kept the same. Since the axial compressive force is expected to decrease as the engine approaches its steady-state temperature and rotational speed, the outer diameter of the outer face 50O may decrease. This may compensate for thermal growth and centrifugal force exerted on the seal runner 50 during use and may allow to maintain a radial height of the gap G substantially constant during a wide range of operating conditions (e.g., takeoff, cruise, etc). Herein, the expression "substantially" implies that variations of plus or minus 10% are acceptable.

Referring more particularly to FIG. 3, in the embodiment shown, the seal runner 50 includes a base 51, a web 52, and a sealing flange 53. The sealing flange 53 is secured to the base 51 via the web 52. The base 51 and the sealing flange 53 extends substantially axially relative to the central axis 11 whereas the web 52 extends substantially radially relative to the central axis 11. The base 51, the web 52, and the sealing flange 53 may be parts of a single monolithic body of the seal runner 50. The base 51 defines the inner face 50I whereas the sealing flange 53 defines the outer face 50O of the seal runner 50. The base 51 extends from a first face 51A to a second face 51B axially spaced apart from the first face 51A. The first face 51A and the second face 51B are compressed one toward the other as depicted with arrows A1 upon the seal runner 50 being axially clamped on the high-pressure shaft 20 between the nut 34 and the protrusion 20A. In other words, an axial compressive force is exerted on the seal runner 50, more particularly on the first face 51A and the second face 51B of the base 51 of the seal runner 50, to secure the seal runner 50 on the high-pressure shaft 20 to ensure that the seal runner 50 rotates conjointly with the high-pressure shaft 20.

In the depicted embodiment, the base 51 has a base outer face 51C opposed to the inner face 50I and the inner face 50I has a curved section 51D, also referred to as concave section. In other words, the base 51 has a U-shape cross-section when seen in a plane containing the central axis 11. The base outer face 51C may include two sloped surfaces extending radially away from the central axis 11 and axially towards the intersection with the web 52. The curved section 51D is located axially between the first face 51A and the second face 51B of the base 51. The web 52 intersects the base 51 at an intersection herein axially overlapping the curved section 51D. In the embodiment shown, the web 52 intersects the base 51 at a location that registers with an apex of the curved section 51D. This apex corresponds to a location where a radial distance between the inner face 50I and the central axis 11 is maximal. Registering the intersection between the web 52 and the base 51 with this apex may maximise an amplitude of movements of the seal runner 50 as will be described below. The inner face 50I includes a first seat section 51E and a second seat section 51F axially spaced apart form the first seat section 51E. The curved section 51D is disposed axially between the first seat section 51E and the second seat section 51F. The first seat section 51E and the second seat section 51F are in abutment against the high-pressure shaft 20 and are used to radially locate the seal runner 50 relative to the shaft.

Figure 4A:
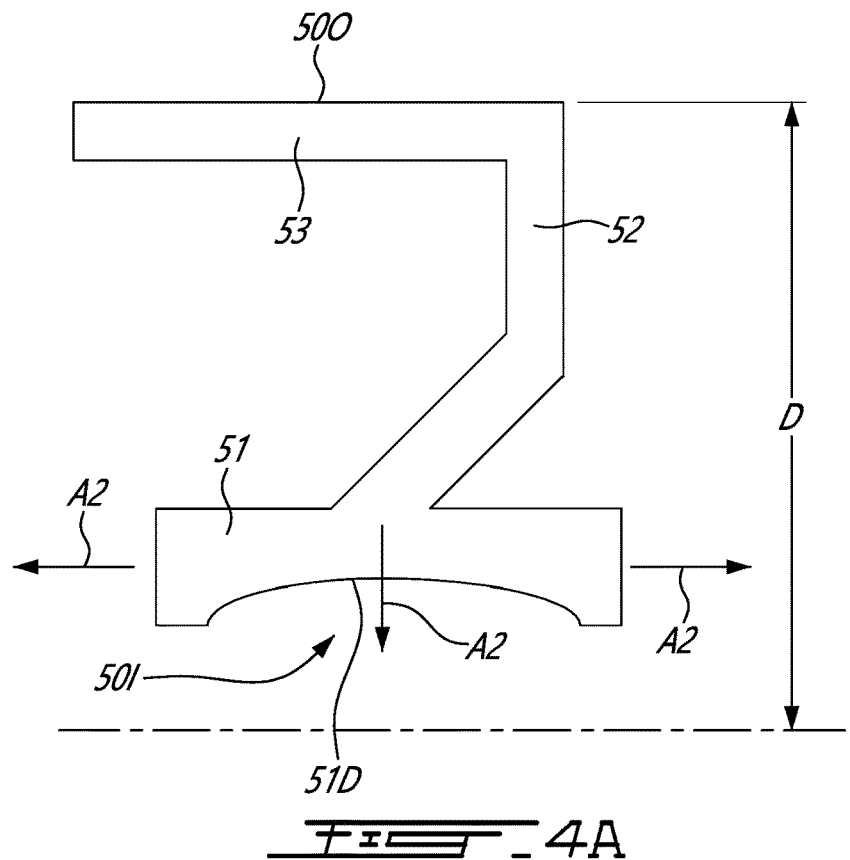
FIG. 4A is a cross-sectional view of the seal runner of FIG. 3 in a pre-loaded shape.
Figure 4B:
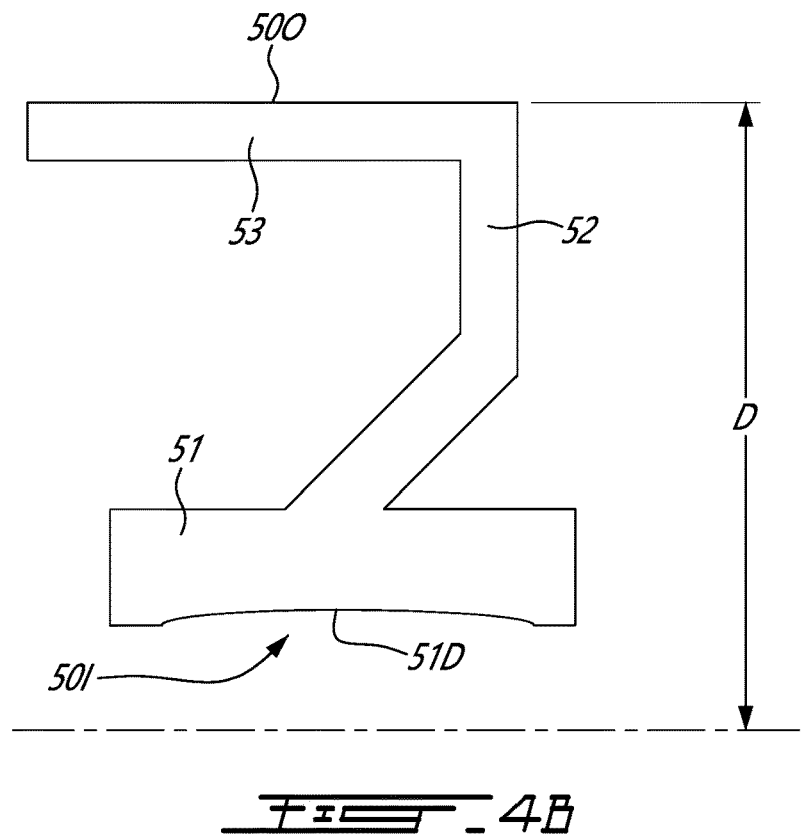
FIG. 4B is a cross-sectional view of the seal runner of FIG. 3 in an at-rest shape.

Referring now to FIGS. 4A and 4B, the seal runner 50 is shown in a pre-loaded shape in FIG. 4A and in an at-rest shape in FIG. 4B. In the at-rest shape, no axial compression force is exerted on the seal runner 50, more particularly on the base 51 of the seal runner 50. In the pre-loaded shape, an axial compression force greater than a threshold is applied on the seal runner 50, more particularly, on its base 51. The pre-loaded shape corresponds to the shape the seal runner 50 has once axially clamped on the high-pressure shaft 20 and when the gas turbine engine 10 is not operation, that is, when the seal runner 50 is not rotating.

In use, as the gas turbine engine 10 is starting, a temperature of the different components increases and a rotational speed of the high-pressure shaft 20 increases. In turn, the seal runner 50 is subjected to thermal growth and centrifugal force that contribute in increasing an outer diameter D of the outer face 50O of the seal runner 50. Moreover, thermal growth and centrifugal force exerted on the other components (e.g., nut 34, spacer(s) 35, etc) being in axial abutment against the seal runner 50 causes the compressive axial force on the seal runner 50 to decrease. This may allow the seal runner 50 to resiliently deform along arrows A2 in FIG. 4A thereby at least partially compensating the increase of the outer diameter D of the outer face 50O caused by thermal growth and centrifugal force.

More specifically, before being mounted on the high-pressure shaft 20, the seal runner 50 is in the at-rest shape of FIG. 4B since no axial force is exerted on it. To secure the seal runner 50 to the high-pressure shaft 20, an axial compressive force is exerted on the seal runner 50, more particularly on the base 51 of the seal runner 50, to ensure that the seal runner 50 rotates conjointly with the high-pressure shaft 20. By this axial compressive force, the seal runner 50 is resiliently deformed from the at-rest shape of FIG. 4B to the pre-loaded shape of FIG. 4A. This resilient deformation causes the outer diameter D of the outer face 50O of the seal runner 50 to increase. In other words, the outer diameter D of the outer face 50O is greater in the pre-loaded shape than in the at-rest shape. This increase in the outer diameter D results from a decrease in an axial width of the base 51 that is accommodated by a radially outward deformation of the base 51. This radially outward deformation, in turn, moves the web 52 and, in so doing, the sealing flange 53 radially outwardly away from the central axis 11 thus increasing the outer diameter D of the outer face 50O defined by the sealing flange 53.

In the present embodiment, the curved section 51D change curvature between the at-rest shape to the pre-loaded shape. The curved section 51D thus has a first curvature in the at-rest shape and a second curvature in the pre-loaded shape. The second curvature is greater than the first curvature. Put differently, the curved section 51D is flatter in the at-rest shape than in the pre-loaded shape.

In operation, as the temperature of the seal runner 50 increases and as its rotational speed increases, the thermal growth and the centrifugal force contribute in increasing the outer diameter D of the outer face 50O of the seal runner 50. However, as explained above, the decreasing of the axial compression force on the base 51 of the seal runner 50 during operation of the gas turbine engine 10 allows the seal runner 50, more particularly the base 51 of the seal runner 50, to deform from the pre-loaded shape towards the at-rest shape. This reduction in the axial compression force permits the axial expansion of the base 51 thereby permitting the radial deformation, which herein results in the curved section 51D of the inner face 50I of the seal runner 50 moving radially inwardly towards the high-pressure shaft 20.

During steady state operation of the gas turbine engine 10, such as during cruise, the shape of the seal runner 50 is expected to be somewhere between the at-rest shape and the pre-loaded shape since some compression force on the seal runner 50 may remain to ensure that the seal runner 50 maintains its axial alignment with the sealing ring 42.

Referring now to FIG. 5, a method of sealing the bearing cavity 31 is shown at 50O. The method 500 includes permitting a flow of compressed into the bearing cavity 31 through the gap G at 502; and at least partially compensating for a decrease in the radial height of the gap G caused by thermal growth and centrifugal force by resiliently deforming the seal runner 50 with a decrease in a compressive axial force exerted on the seal runner 50.

In the present embodiment, the resiliently deforming of the seal runner 50 includes decreasing the curvature of the inner face 50I. This may include moving the curved section 51D of the inner face 50I towards the shaft. The resiliently deforming of the seal runner 50 may include moving the intersection between the web 52 and the base 51 towards the shaft. The resiliently deforming of the seal runner 50 may include increasing the axial width of the seal runner 50.

For the seal runner 50, the initial clearance may be reduced due to the initial radial displacement as shown in FIG. 4A in the pre-loaded shape. This may have a positive impact on the engine performance since the clearance at the engine start-up may be reduced since the preload is high at ambient temperature. The high initial preload tends to close the initial gap (cold clearance) by promoting radial deformation of the seal runner 50. The seal runner 50 may compensate for the radial displacement due to the centrifugal force and the thermal expansion because of this initial deformation due to the preload. Furthermore, the high compliance of this inverted u-shape runner may tend to reduce the stack stiffness and at the same time promote the preservation of the pretension in the stack due to its initial deformation. In other words, the seal runner 50 acts like a spring. This may have a positive impact on the life of the parts in this stack.

Also, this seal runner 50 may open the clearance while the centrifugal force and the thermal load tends to close it. The reason is that at takeoff, where the centrifugal force and temperature are at their maximum, is also the condition where the preload is low. The radial clearance compensation is due to the negative radial displacement of the runner operating surface created by the loss of preload.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
   a shaft rotatable about a central axis;

a housing mounted around the shaft, the shaft rotatable relative to the housing; and a seal assembly disposed radially between the shaft and the housing relative to the central axis, the seal assembly having:

a sealing ring mounted to the housing, and a seal runner secured to the shaft, the seal runner extending radially relative to the central axis from an inner face facing the shaft to an outer face facing the sealing ring and being radially spaced apart from the sealing ring by a gap, the seal runner resiliently deformable from an at-rest shape where no axial compression force is exerted on the seal runner to a pre-loaded shape where the seal runner is axially clamped on the shaft by an axial compression force, an outer diameter of the outer face greater in the pre-loaded shape than in the at-rest shape;

wherein the inner face has a curved section having a first curvature in the at-rest shape and a second curvature in the pre-loaded shape, the second curvature greater than the first curvature.

2. The aircraft engine of claim 1, wherein the seal runner includes a base secured to the shaft and defining the inner face, a sealing flange secured to the base and defining the outer face, and a web connecting the sealing flange to the base, an intersection between the web and the base axially overlapping a curved section of the inner face.

3. The aircraft engine of claim 2, wherein the base has a U-shape cross-section taken in a plane containing the central axis.

4. The aircraft engine of claim 3, wherein the intersection between the web and the base is located at an apex of the curved section of the inner face.

5. The aircraft engine of claim 2, wherein an axial width of the base is greater in the at-rest shape than in the pre-loaded shape.

6. The aircraft engine of claim 1, wherein the inner face further includes a first seat section and a second seat section, the curved section disposed between the first seat section and the second seat section, the first seat and the second seat sections in abutment against the shaft.

7. A seal assembly, comprising:

a sealing ring circumferentially extending around a central axis; and a seal runner disposed radially inwardly of the sealing ring relative to the central axis, the seal runner having an inner face facing the central axis, and an outer face facing the sealing ring and spaced apart from the sealing ring by a gap, wherein the seal runner is resiliently deformable from an at-rest shape where no axial compression force is exerted on the seal runner to a pre-loaded shape when an axial compression force above a threshold is exerted on the seal runner, a radial height of the gap decreasing from the at-rest shape to the pre-loaded shape of the seal runner;

wherein the inner face includes a first seat section, a second seat section, and a curved section between the first seat section and the second seat section, the first seat and the second seat sections abuttable against a shaft.

8. The seal assembly of claim 7, wherein the curved section has a first curvature in the at-rest shape and a second curvature in the pre-loaded shape, the second curvature greater than the first curvature.

9. The seal assembly of claim 7, wherein the seal runner includes a base defining the inner face, a sealing flange secured to the base and defining the outer face, and a web connecting the sealing flange to the base, an intersection between the web and the base axially overlapping a curved section of the inner face.

10. The seal assembly of claim 9, wherein the base has a U-shape cross-section taken in a plane containing the central axis.

11. The seal assembly of claim 10, wherein the intersection between the web and the base is located at an apex of the curved section of the inner face.

12. The seal assembly of claim 9, wherein an axial width of the base is greater in the at-rest shape than in the pre-loaded shape.

13. A method of sealing a cavity disposed radially between a housing and a shaft of an aircraft engine, the method comprising:

permitting a flow of compressed air into the cavity through a gap defined between a seal runner and a sealing ring of a seal, the gap having a radial height; and at least partially compensating for a decrease in the radial height caused by thermal growth and centrifugal force by resiliently deforming the seal runner with a decrease in a compressive axial force exerted on the seal runner, wherein the seal runner has an inner face facing the shaft, and wherein the resiliently deforming of the seal runner includes decreasing a curvature of the inner face.

14. The method of claim 13, wherein the decreasing of the curvature of the inner face includes moving a curved section of the inner face towards the shaft.

15. The method of claim 13, wherein the seal runner includes a base secured to the shaft and defining the inner face of the seal runner, a sealing flange secured to the base and defining the outer face, and a web connecting the sealing flange to the base, an intersection between the web and the base axially overlapping a curved section of the inner face, the resiliently deforming of the seal runner includes moving the intersection towards the shaft.

16. The method of claim 15, wherein the intersection between the web and the base is located at an apex of the curved section of the inner face.

17. The method of claim 13, wherein the resiliently deforming the seal runner includes increasing an axial width of the seal runner.

\* \* \* \* \*